United States Patent [19]

Kedrinsky et al.

[11] 3,921,338
[45] Nov. 25, 1975

[54] STRAIGHT BEVEL GEAR GRINDING MACHINE

[76] Inventors: Vasily Nikolaevich Kedrinsky, ulitsa Vavilova, 93, kv. 23; Ivan Dmitrievich Zakharov, Kavkazsky bulvar 41, korpus 1, kv. 5, both of Moscow, U.S.S.R.

[22] Filed: Aug. 27, 1973

[21] Appl. No.: 392,059

[52] U.S. Cl. .............. 51/33 W; 51/52; 51/105 R
[51] Int. Cl.² ............................. B23F 5/10
[58] Field of Search ......... 51/287, 32, 33 R, 33 W, 51/52, 55, 56, 105 R; 90/6

[56] References Cited
UNITED STATES PATENTS

| | | | |
|---|---|---|---|
| 1,830,952 | 11/1931 | McMullen et al. | 51/287 X |
| 2,620,599 | 12/1952 | Riley | 51/52 |
| 2,747,468 | 5/1956 | Wildhaber | 90/6 |
| 3,393,478 | 7/1968 | Fabish et al. | 51/287 |

*Primary Examiner*—Al Lawrence Smith
*Assistant Examiner*—K. J. Ramsey
*Attorney, Agent, or Firm*—Haseltine, Lake & Waters

[57] ABSTRACT

The machine generates gear teeth by means of an abrasive tool which is essentially a disk wheel with a flat peripheral face formed between taper side faces. The wheel is mounted on a spindle driven at the grinding speed from the main drive and adapted for set-up movement along its axis of rotation. The wheel spindle is mounted on a carriage which imparts to the wheel a reciprocating motion along the gear tooth being ground. The carriage is mounted on a cradle which gives the wheel a generating motion and is kinematically connected with the workhead spindle in such a manner that while the grinding wheel is moving along its axis of rotation said cradle and workhead spindle turn about their axes of rotation relative to each other, whereby the single grinding wheel is enabled to machine both sides of the gear tooth at one setting of the work.

8 Claims, 9 Drawing Figures

STRAIGHT BEVEL GEAR GRINDING MACHINE

This invention relates to gear cutting machines and has particular reference to straight bevel grinding machines. It may be used with particular advantage for production of straight bevel gears with a small module (1.5 mm and less).

Known in the art are gear grinding machines which generate straight bevel gears by means of two abrasive disk wheels.

Each of the grinding wheels is mounted on its particular spindle driven from the main drive and each wheel spindle is mounted on an individual carriage, the latter being mounted in a cradle in such a manner as to have a set-up movement for a mean apex distance. The cradle imparts a generating motion to the grinding wheels and is kinematically connected with the workhead spindle which mounts the gear being machined. The grinding wheels have no reciprocating motion along the gear tooth. The cutting surfaces of the grinding wheel in contact with the gear blank reproduce the action of the teeth of an imaginary generating gear in mesh with the gear being machined.

The size of bevel gears that can be produced on such machines is limited by the width of the gear rim which can be dealt with by the cutting faces of the grinding wheels at the maximum possible wheel diameter. This condition narrows the field of application of the machines under discussion.

In order to grind straight bevel gears on such machines, one of the following conditions should be fulfilled: (a) The tooth spaces should be preliminarily cut on gear-cutting machines by means of a pair of disk cutters so as to have the tooth bottom lands curved with essentially the same radius as the radius of grinding wheel thus provide against projections being left after grinding, (b) The blanks should be preliminarily machined on a straight bevel gear cutting machine to an increased tooth depth, which weakens the teeth.

Another disadvantage of these machines is that the cutting faces of the grinding wheels contact the entire heat-treated surfaces of the teeth, excessively heating them during the grinding process. This adversely affects tooth hardness or causes microcracks and burns, which defects result in chipping and mutilation of the teeth and in impaired strength characteristics of the gears.

In connection with these disadvantages the machines under consideration permit of removing only very little material and make it necessary to employ high rates of rotary feed (angular motion of the cradle), which results in dynamic overloading of the machine mechanisms and of the train which effects the kinematic connection between the cradle carrying the grinding wheels and the spindle carrying the work. This, in turn, adversely affects the accuracy of gear manufacture.

Since the amount of metal removed per wheel pass is very small, the working capacity of the machines being discussed is low.

It is also difficult to obtain high finish of the ground surfaces inasmuch as all the mechanical defects caused to the cutting faces of the grinding wheel in the process of diamond truing are fully transferred onto the surfaces of the gear teeth.

There are also known straight bevel gear generating machines employing two abrasive disk wheels adapted to move along the tooth being machined.

These grinding wheels have a very narrow (2 mm maximum) peripheral face which contacts the side surfaces of the tooth being ground.

Since the quantity of the abrasive particles which take place in the grinding during the generating process is small, these particles rapidly become dull and dislodged. This condition is aggravated by the necessity for multiple passes where little stock is removed per pass. In addition, the grinding wheels have to be constantly inspected and trued in order to maintain the width of the working face within the maximum of 2 mm.

The means required for this purpose are, as a rule, of intricate construction and call for high precision. They are installed on the carriages which mount the grinding wheels and give them a reciprocating motion along the gear tooth, owing to which the carriages are equipped with complicated precision mechanisms which cannot move at substantially high rates. This condition results in low speed and low working capacity of the machines under consideration. Apart from this, the employment of complicated precision carriage mechanisms calls for grinding without the use of coolant liquids. This again, causes overheating of the heat-treated tooth surfaces, leading to development of burns and microcracks.

It should also be noted that the machines concerned cannot be employed for grinding gears from whole blanks.

In another type of straight bevel gear generating machines known in the art use is made of two grinding disk wheels adapted to reciprocate along the tooth being machined.

In these machines, each grinding wheel has a taper cutting surface and grinds one side of the tooth in its particular tooth space. When grinding a whole blank, the wheels apply cutting forces different in magnitude and direction, which adversely affects the quality and accuracy of gear manufacture.

The practice of straight bevel gear production has put forward a problem of manufacturing bevel gears with a module below 1.5 mm, in particular in the cases where the material is too hard to be dealt with by gear cutting methods.

One of the difficulties arising from this problem is that the commonly employed method of producing large-module bevel gears (module over 1.5 mm), namely, first cutting the gear rough then heat-treating it and thereafter grinding the tooth side surfaces, is not applicable to the manufacture of small-module bevel gears (module below 1.5 mm) due to the fact that, with a small module, it is practically impossible to enter a disk wheel into the tooth space already cut and to correctly proportion stock removal. Another difficulty is that the two grinding wheels should be of substantially small diameter in order to clear each other and, therefore, rapid wear of the wheels makes it inexpedient to employ the machines concerned for grinding small-module bevel gears from solid blanks. (For the same reason, this method of grinding cannot be employed for producing bevel gears with a module over 1.5 mm where the cone distance is short).

Means for eliminating the disadvantages described above are known to be used.

One of such means is a gear grinding machine attachment comprising a pair of additional spindles carrying abrasive disk wheels of substantially small diameter (of the order of 50 mm). Each additional spindle is installed on the appropriate carriage mounting the main spindle. The main spindle grinding wheels are removed and the small grinding wheels are positioned so as to reproduce the action of the teeth of an imaginary generating gear in mesh with the gear being machined.

This arrangement permits of grinding bevel gears with a module of 0.5 mm, but is should be noted again that since the wheel diameter is small, the grinding wheels wear out rapidly, which militates against grinding whole blanks without preliminarily cutting tooth spaces.

It is known to use gear planer attachments in the form of a grinding wheel head mounting a single wheel for machining straight bevel gears. The wheel may have a flat face and taper sides or may be contoured where the requirements of the accuracy of the tooth profile are not high.

Such a grinding wheel head suffers from the disadvantage that after grinding one side of the tooth space resetting is necessary to grind the other side. This resetting is made manually to templets, which takes much time and, consequently, slows down the production.

Also known are straight bevel gear grinding machines for generating gear teeth by means of an abrasive wheel mounted on a spindle driven from the main drive. The spindle is mounted on a carriage which reciprocates the grinding wheel along the tooth being ground and is mounted on a cradle arranged to impart to the grinding wheel a generating motion and kinematically connected with the workhead spindle.

The grinding wheel used in the machines under discussion has a flat peripheral face and a taper side. Since the sides of the straight teeth in bevel gears converge towards the apex, the machines concerned have to be reset preparatory to grinding each side of the tooth. This is done as follows. The carriage which mounts the spindle with the grinding wheel is turned manually through 180°, for which purpose the train connecting the cradle to the spindle is disengaged. The work is released, turned manually in relation to the spindle through an angle approximately equal to the root cone angle and then is fixed on the spindle in position. Thereafter the grinding wheel is entered into the tooth space at the tooth side already ground. The amount of stock to be removed from the other side of the tooth is determined visually.

After these operations are accomplished, grinding is commenced. After two or three teeth are machined, their thickness is measured in order to ascertain whether the proportioning of stock removal is correct. To obtain correct proportioning of stock removal, the operations described above have to be repeated many times. Apart from waste of time, this condition adversely affects the accuracy of the shape of the teeth and the entire gear, let alone the operating difficulties and the need for highly qualified operators.

With small-module (1.5 mm and below) gears, the resetting described above cannot be accomplished at all inasmuch as it is practically impossible to enter the grinding wheel into a very small tooth space already cut and finally ground on one side.

It is an object of this invention to eliminate the disadvantages described above.

It is a specific object of this invention to devise a straight bevel gear grinding machine which, by provision of an appropriate abrasive disk tool and an appropriate kinematic connection between the cradle and the workhead spindle, will be capable of generating gears, mainly small-module gears (module less than 1.5 mm), from a solid blank.

It is a further specific object of the invention to devise a straight bevel gear grinding machine for generating gears with a higher accuracy than that attained by the machines of this type known hitherto.

It is a still further object of this invention to devise a straight bevel gear grinding machine capable of generating gears at a high working rate.

These and other objects are achieved by devising a straight bevel gear grinding machine for generating gear teeth by means of an abrasive disk tool. According to the invention, the abrasive disk tool, which is essentially a grinding wheel with a flat peripheral face formed between taper faces, is adapted for set-up movement along its axis of rotation. There is provided a cradle kinematically connected with the workhead spindle in such a manner that while the grinding wheel is moving along its axis of rotation the cradle and spindle turn about their axes of rotation relative to each other, whereby the single abrasive tool is enabled to grind two sides of the gear tooth at one setting.

The machine constructed according to the invention can be advantageously used to grind gears, mainly with a module less than 1.5 mm, from a solid blank, with a high accuracy and at a high working rate.

It is desirable that the spindle which carries the abrasive tool be mounted on a carriage by means of a sleeve, the spindle being positioned in the sleeve coaxially therewith and adapted to rotate in relation thereto. It is further desirable that the sleeve be connected to movable elements of power cylinders for the sleeve, together with the spindle carrying the abrasive tool, to have periodical set-over movements along the axis of rotation of said abrasive tool. The purpose of said set-over movements is to enable both sides of the gear tooth to be ground by means of a single abrasive tool.

It is advantageous, for the purpose of adjusting the said set-over movements of the sleeve and spindle along the axis of rotation of the abrasive tool, to provide the carriage with an adjustment mechanism comprising axial positive stops constructed in the form of cams which are located in a slot formed in the exterior of the sleeve and are fixed to the ends of pins rotatably mounted on the carriage, the other ends of the pins carrying graduated dials to indicate the amount of said movements.

In order that the invention may be readily carried into effect, it is recommended that the train between the cradle and the workhead spindle, wherein the end members are constructed in the form of a worm and wheel, be provided with an arrangement for imparting an axial movement to at least one of the worms by means of which the cradle and the workhead spindle perform rotational movements relative to each other. It is desirable that this arrangement should comprise an individual drive and a crank gear with a connecting rod attached at one end to the worm housing and at the other end, pivotably connected to the crank pin.

The purpose of this design is to enable both sides of the tooth being ground to be machined at one setting.

The crank gear may be individually operated by a power cylinder through a rack connected to the movable element of said power cylinder and constantly meshed with a gear fixedly secured to the shaft associated with the crank gear.

The crank disk has a radial projection which limits the crank angular movement by coming up against a fixedly secured stop. The crank pin fits into a diametrically disposed slot provided in the crank disk and is adapted to have a set-up movement to effect adjustment which determines the amount of rotational movements performed by the cradle.

The above mentioned crank mechanism is mounted in a housing which is pivotably mounted on a stationary element of the machine and movable through an angle about said pivot by means of a screw with a handwheel. It makes possible to impart an extra rotation to the cradle for stock dividing purpose.

Now the invention will be described in detail with reference to the accompanying drawings in which.

Figure 1:
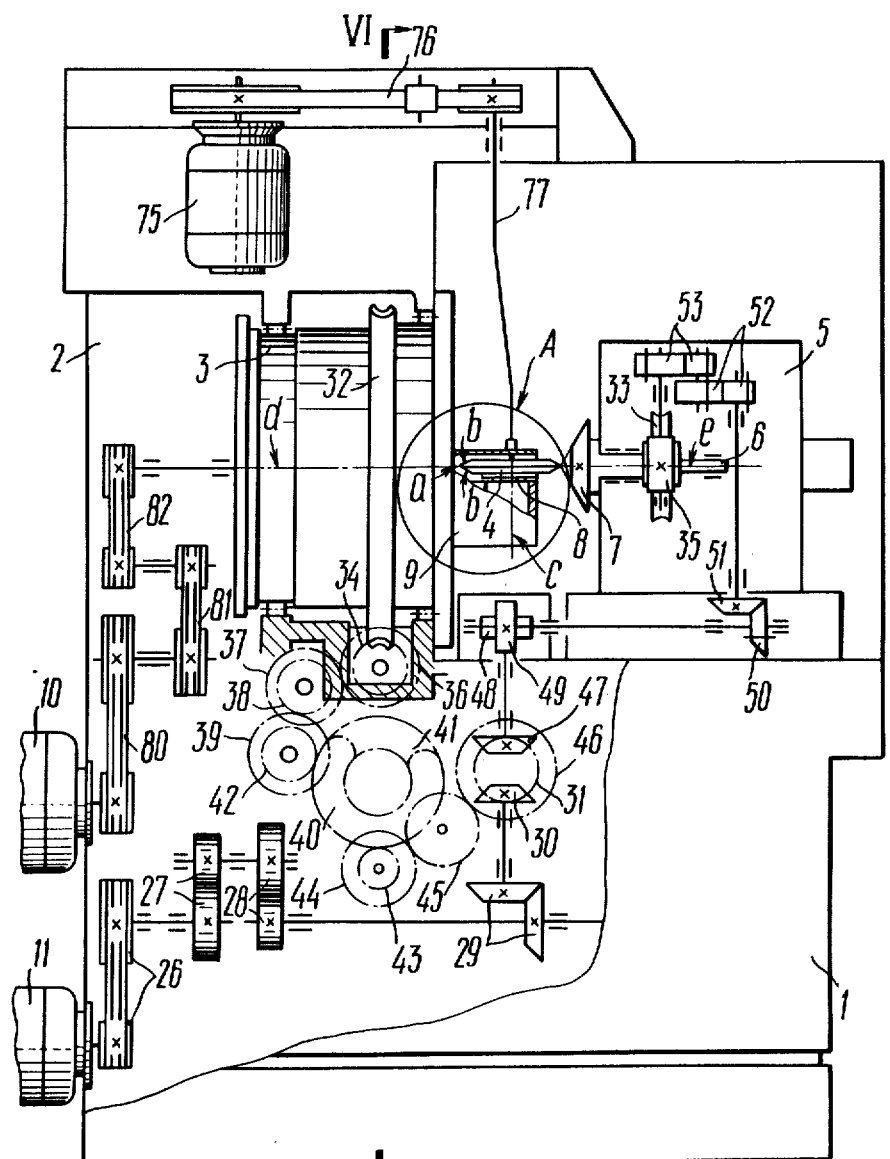
FIG. 1 is a front cutaway view showing the diagram of the straight bevel gear grinding machine designed according to the invention.
Figure 7:
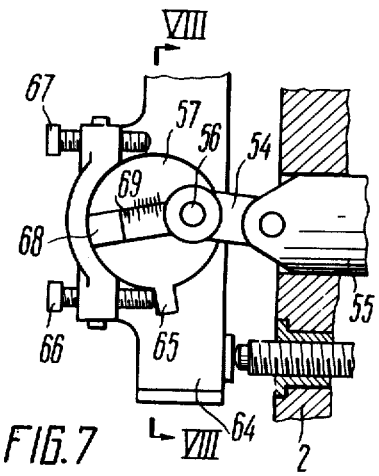
Figure 8:
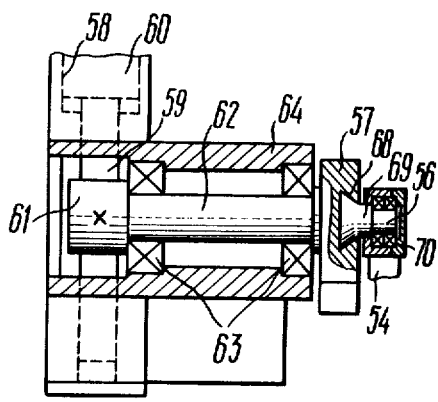
Figure 2:
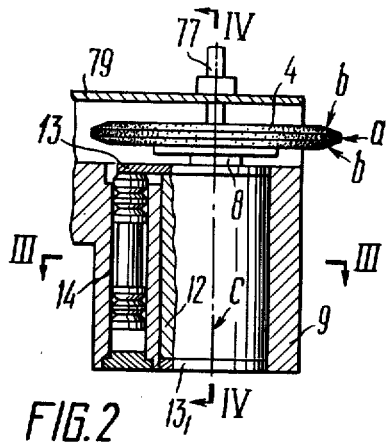
FIG. 2 is an enlarged cutaway view of the detail A of FIG. 1.
Figure 4:
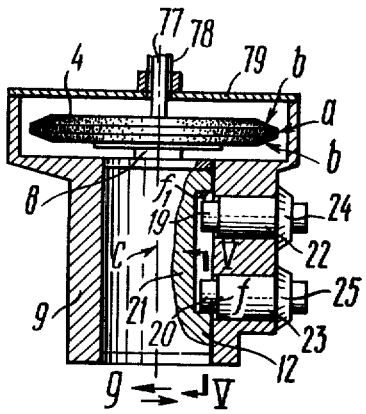
Figures 3, 5:
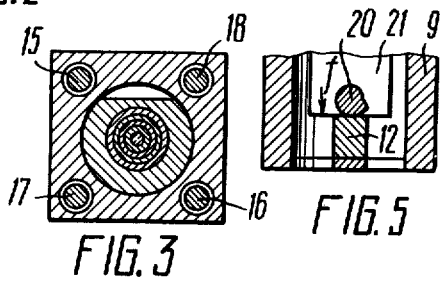
Figure 6:
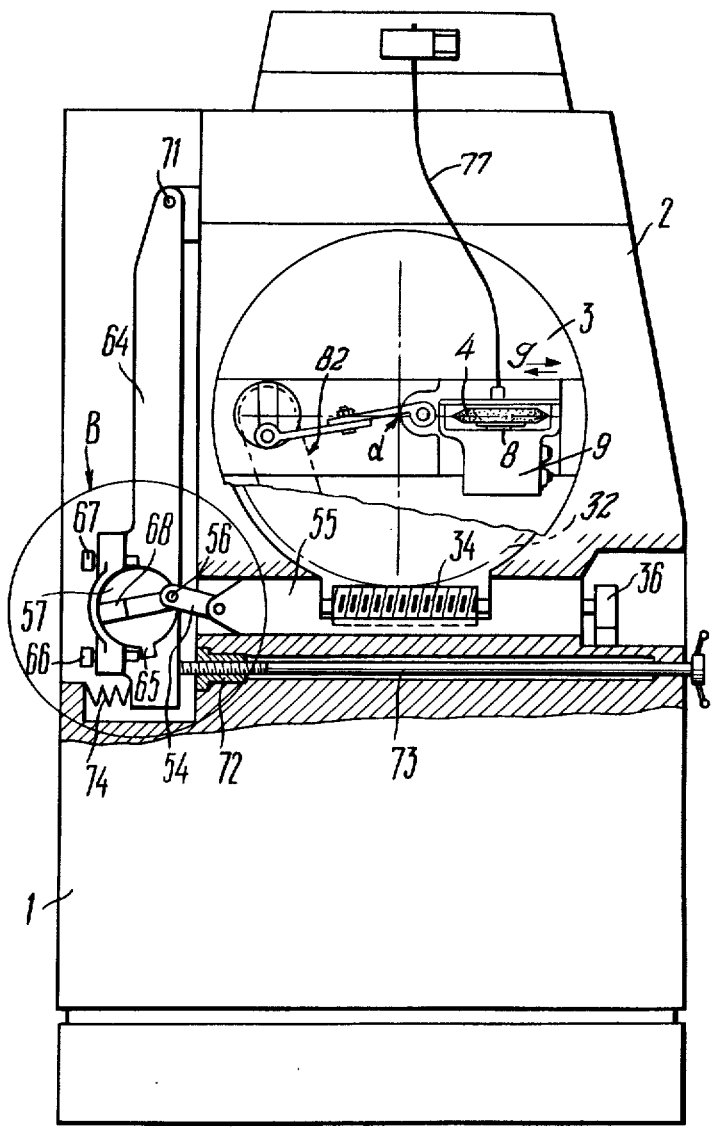
Figure 9:
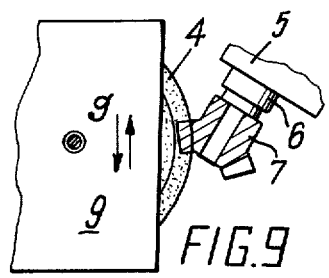

FIG. 3 is a section on the line III—III of FIG. 2.
FIG. 4 is a section on the line IV—IV of FIG. 2.
FIG. 5 is a fragmentary sectional view on the line V—V of FIG. 4.
FIG. 6 is a part-sectional view on the line VI—VI of FIG. 1, showing the construction of the worm axial adjustment mechanism.
FIG. 7 is an enlarged view of the detail B of FIG. 6.
FIG. 8 is a section on the line VIII—VIII of FIG. 7.
FIG. 9 is a fragmental plane view showing how the grinding wheel reciprocates along the tooth being ground.

According to the invention, there is provided a straight bevel gear grinding machine for generating gear teeth by means of an abrasive disk tool.

A bed 1 (FIG. 1) mounts a wheelhead 2 which carries a cradle 3 with a grinding wheel 4. Also mounted on the bed 1 is a workhead 5 whose spindle 6 carries a work 7.

The grinding wheel 4 is mounted on a spindle 8 driven at a grinding speed from the main drive.

The spindle 8 is mounted in a carriage 9 which is installed in horizontal ways (not shown) provided in the cradle 3 and is driven from an electric motor 10 in order to impart to the grinding wheel 4 a reciprocating motion along the tooth being ground in the work 7.

The cradle 3 is kinematically connected with the workhead spindle 6 and receives drive from an electric motor 11 to impart a generating motion to the grinding wheel 4.

According to the invention, the grinding wheel 4 having a cylindrical peripheral surface $a$ formed between taper faces $b$, is adapted for set-over movement along its axis $c$ of rotation.

According to the invention, the spindle 8 which carries the grinding wheel 4 is mounted on the carriage 9 by means of a sleeve 12, the spindle 8 being positioned in the sleeve 12 coaxially therewith and adapted to rotate in relation thereto. The sleeve 12 is connected by means of flanges 13 and $13_1$ to the movable elements of power cylinders 14 for the sleeve 12, together with the spindle 8 and the grinding wheel 4 mounted thereon, to have set-over movements along the axis $c$ of rotation of the grinding wheel 4.

In the embodiment under consideration the power cylinders 14 are formed by bores which are provided in the carriage 9 and accommodate plungers. The plungers 15 and 16 (FIG. 3) move the sleeve and spindle in one direction, the plungers 17 and 18 move them in the opposite direction.

According to the invention, for the purpose of adjusting the length of movements of the sleeve 12 and spindle 8 along the axis $c$ of rotation of the grinding wheel 4, the carriage 9 (FIG. 4) is provided with an adjustment mechanism comprising axial positive stops designed in the form of cams 19 and 20 which are located in a slot 21 formed in the exterior of the sleeve 12 and are fixed to the ends of pins 22 and 23, respectively, rotatably mounted on the carriage 9, the other ends of the pins 22 and 23 carrying dials 24 and 25 to indicate the amount of said set-up movements.

FIG. 5 shows the cam 20 located in the slot 21 and engaged with the flat surface $f$ of the sleeve 12.

The generating motion is received from the electric motor 11 through a belt transmission 26, gear pairs 27 and 28, a bevel gear pair 29 and a bevel gear 30 which is in constant mesh with a bevel gear 31.

The bevel gear 31 is a driving member of the train which connects the cradle 3 with the workhead spindle 6. The end members of this train are designed in the form of a worm and wheel. The worm wheesl 32 and 33 are rigidly attached to the cradle 3 and the spindle 6 respectively and constantly mesh with the worms 34 and 35.

Fixedly secured to the shaft of the worm 34 is a gear 36 which is in constant mesh with a gear 37 mounted on the same shaft which carries a gear 38 meshing with a gear 39.

The gears 36, 37, 38 and 39 are change members of a generating train by combination of which the machine can be set up for required ratio of roll.

The gear 39 is mounted on the driven shaft of a reversing mechanism the function of which is to impart to the cradle 3 a rocking motion in strict accordance with the rotational motion of the workhead spindle 6.

The reversing mechanism comprises a toothed gear 40 comprising an unbroken toothed contour with external and internal teeth and a fully toothed gear 41 with external teeth. The gears 40 and 41 are fixedly joined to form a gear cluster.

The fully toothed gear 41 is in constant mesh with a gear 42 which is mounted on the driven shaft together with the gear 39. A gear 43 mounted on the driving shaft is adapted for constant meshing with the toothed contour of the gear 40. The reversing mechanism is not the subject of present invention. It is described in all particulars in the English Pat. No. 1082998, granted Mar. 4, 1968, but as a matter of fact it can be made of any appropriate type.

Mounted on the shaft which carries the gear 43 is a gear 44 constantly meshing with a gear 45 which, in turn, constantly meshes with a gear 46 fixedly mounted on the shaft which carries the bevel gear 31 incorporated in the generating drive.

From the bevel gear 31 the drive is taken to the worm wheel 33 which is mounted on the workhead spindle 6.

The bevel gear 31 is in constant mesh with a bevel gear 47 fixedly mounted on the shaft which carries a helical gear 48 constantly meshing with another helical gear 49. The shaft on which is fixedly mounted the gear 49 also carries a bevel gear 50, the latter being adapted to move along the shaft in the process of setting up the workhead 5. The gear 50 constantly meshes with a bevel gear 51 which transmits the drive to the worm 33 through two pairs 52 and 53 of spur gears.

The spur gears which form the pairs 52 and 53 are change members of the indexing train.

According to the invention, the machine incorporates an arrangement for imparting an axial movement to at least one of the worms by means of which the cradle 3 and the workhead spindle 6 perform mutual rotational movements about the axes $d$ and $e$.

In the embodiment under consideration said axial movement is imparted to the worm 34 which meshes with the wheel 32 fixedly mounted on the cradle 3.

The arrangement for imparting an axial movement to the worm 34 comprises an individual drive mechanism and a crank gear which includes a connecting rod 54 (FIGS. 6 and 7). One end of the connecting rod 54 is pivoted to a housing 55 wherein the worm 34 is mounted for rotation. The other end of the connecting rod 54 is connected to a crank pin 56.

Such a design, in conjunction with the provision for axial movement of the grinding wheel, enables to make the automatic set-over for grinding the other side of the tapered tooth thus both sides of the tooth being ground to be machined at one setting.

According to the invention, the independent drive mechanism of the crank gear comprises a power cylinder 58 (FIG. 8). The drive is transmitted through a rack 59 connected to a power cylinder movable element 60 and constantly meshing with a spur gear 61 fixedly mounted on a shaft 62 which also carries the crank disk 57. The shaft 62 is mounted on bearings 63 accommodated in a crank gear housing 64.

According to the invention, the crank disk 57 has a radial projection 65 (FIGS. 6 and 7) which limits the angular movement of the crank by coming up against an adjustable stop. In the embodiment being described two stops 66 and 67 are disposed diametrically opposite to each other, permitting the crank to rotate within 180°.

The design of the crank gear ensures accurate axial movement of the worm 34 and makes it possible to finely adjust the worm movement for high precision of the tooth thickness because the latter depends on the angle through which the cradle rotates during the set-over.

The crank disk 57 is provided with a diametrically disposed slot 68. The part-sectional elevation in FIG. 8 shows the slot 68 accommodating a slide 69 which mounts or made integral with a pin 56 with bearings 70 for the connecting rod 54.

By provision of the slide 69, the pin 56 is enabled to move in the slot 68 for a preset amount which together with the stops 66 and 67 which are used for fine adjustment, determines the amount of the rotational movement of the cradle 3 about its axis $d$.

According to the invention, the crank gear housing 64 is mounted on a stationary element (in this embodiment, on the wheelhead 2 in which the cradle 3 is mounted for rotation) so that it can be positively pivoted in the plane of location of the worm and wheel, whereby provision is made for adjusting the worm axially.

Referring to FIG. 6, the crank gear housing 64 is pivoted to the wheelhead 2 by means of a pivot pin 71 so that, for the purpose of axially adjusting the worm 34, the housing 64 may have a pivotal movement in the plane of location of the worm 34 and the wheel 32.

This design enables the machine to effect high-precision grinding of gears with preliminarily cut tooth spaces, particularly where carburized heat-treated steels are involved, and permits of accurately proportioning the removal of the stock from either side of the tooth being ground.

According to the invention, the pivotal movement of the crank gear housing 64 is effected by means of a screw pair comprising a nut 72 and a screw 73. The nut 72 is secured in the wheelhead 2. The screw 73 contacts the crank gear housing 64 which is held against said screw by a spring 74 whose end remote from the housing 64 is secured to the wheelhead 2.

The main drive comprises an electric motor 75 (FIG. 1), a belt transmission 76 and a flexible shaft 77 which is connected to the spindle 8 by any appropriate means known in the art. The flexible shaft 77 is enclosed in a casing 78 (FIG. 4) which is secured to the cover 79 of the carriage 9.

The drive for giving the support 9 reciprocating movements along arrows $g$ (FIG. 4) in order to move the grinding wheel along the tooth being ground comes from the electric motor 10 (FIG. 1) through belt transmissions 80, 81 and 82 and through a mechanism (not shown) for converting the rotary motion of the driven pulley of the belt transmission 82 into the reciprocating movement of the carriage 9. This mechanism may be constructed in any appropriate form known in the art. The pulleys of the belt transmission 82 are changeable to provide for varying the rate of the carriage movement.

Other means also essential for the operation of the machine, such as a cycle drum to control the machine, a hydraulic system, a cooling system, a wheel truing attachment and other mechanisms, are not described herein for the sake of clarity of the main subject of the invention.

The straight bevel gear grinding machine which constitutes the present invention operates as follows:

Preparatory to the operation, the work 7 (FIG. 1) is mounted to the spindle 6 by any appropriate means known in the art. Then the grinding wheel 4 is secured on the spindle 8 by conventional means.

The workhead 5, which is mounted on the bed 1 so as to be movable along the axis $e$ of the spindle 6 and rotatable about the vertical axis which is perpendicular to the axis $e$ of the spindle 6 and lies in the plane passing through the axis $d$ of the cradle 2, is set by conventional means to suit the characteristics of the gear to be machined, i.e. the module, number of teeth, cone distance face width, etc.

Then, depending on the gear characteristics mentioned above, the generating change gears 36, 37, 38 and 39, the indexing change gear pairs 52 and 53, and the pulleys of the belt transmission 82 are installed in the necessary combination.

The set-over movement of the spindle 8 with the grinding wheel 4 along the wheel axis $c$ (FIG. 4) is adjusted to the calculated value by turning the dials 24 and 25 of the set-up mechanism.

In the crank gear of the mechanism for the set-over movement of the worm 34, the crank pin 56 is displaced so as to move the slide 69 in the slot 68 by the amount which determines the amount of the rotational set-over movement of the cradle 3 about its axis $d$.

The hydraulic system of the machine is made ready for operation. During this process the plungers 15 and 16 (FIG. 3), acting on the flange 13 (FIG. 2), move the sleeve 12 so that its surface $f$ (FIGS. 4 and 5) comes into engagement with the preset cam 20. As a result, the grinding wheel 4 (FIG. 1) assumes the required (upper) position in relation to the axis $d$ of the cradle 3.

The movable element 60 of the power cylinder 58 (FIG. 8) incorporated in the crank gear drive moves into the lowermost position. The rack 59 associated with the element 60 also moves therewith and thus turns the gear 61 and, consequently, the shaft 62 with the crank 57. The crank 57 turns until its projection 65 (FIG. 7) comes up against the stop 66. During the rotational movement of the crank 57 the connecting rod 54, which is pivoted to the slide 55, imparts an axial motion to the worm 34 (FIG. 6), which, being in constant mesh with the worm wheel 32 fixedly secured to the cradle 3, gives said cradle a rotational motion about the axis $d$.

Now the machine is ready for operation.

The main drive motor 75 is switched on and the drive is taken through the belt transmission 76 and the flexible shaft 77 to the spindle 8 and the grinding wheel 4, said grinding wheel being rotated at the grinding speed.

Switching on the motor 10 initiates the reciprocating movement of the carriage 9, the drive being taken from the motor 10 through the belt transmissions 80, 81 and 82 and through a conventional mechanism for converting a rotational motion into a reciprocating motion.

Next the generating drive motor 11 is switched on. The drive is taken from the motor shaft through the belt transmission 26, gear pairs 27 and 28, a bevel gear pair 29 and a gear 30 to the bevel gear 31. Thence the drive comes through the gears 46, 45, 44 and 43 and further through the reversing mechanism, namely, the toothed contour of gear 40, and gear 41, to the gear 42 and thence via the generating change gears 39, 38, 37 and 36 to the worm 34 which meshes with the worm wheel 32 mounted on the cradle 3 carrying the spindle 6 with the grinding wheel 4. It will be noted that when the gear 43 meshes with the external part of toothed contour of the gear 40 the cradle rotates in working direction. When the gear 43 meshes with internal teeth of said contour the cradle rotates in reverse direction (quick return).

At the same time the drive is taken from the bevel gear 31 through the gears 47, 48, 49, 50 and 51 and then through the pairs 52 and 53 of the index change gears to the worm 35 which meshes with the worm wheel 33 associated with the spindle 8 mounting the work 7.

The workhead 5 is moved on the bed 1 to bring the work 7 to the grinding wheel 4.

The generating process commences.

During the machining of the work 7 the grinding wheel 4 receives a rotational motion at the grinding speed, a reciprocating motion along the gear teeth being ground and a generating motion in the form of rated rotary motion of the cradle 3 and the work spinle 6. During the return rotation of the cradle the workhead 5 is withdrawn by some common means.

With the arrangement described, the indexing of the work is effected by the continuing rotation of the work during the return rotation of the cradle, whereby during each successive generating roll the wheel cuts in succeeding tooth space of the work although usually not the next succeeding space. However as those skilled in the art will readily understand, the invention is equally applicable to machines of the kind employing an intermittent indexing mechanism in which the work spindle is indexed relative to the drive train once during each generating cycle.

The machining process is effected essentially in the conventional manner and will not be described in detail for the sake of clarity of the main subject of the invention.

After the last tooth of the work 7 has been machined on one side, the cycle counter (not shown) initiates the action of the hydraulic system. The plungers 17 and 18 (FIG. 3), acting on the flange $13_1$ (FIG. 2) move the sleeve 12 so that the surface $f_1$ (FIG. 4) comes into engagement with the preset cam 19. As a result, the grinding wheel 4 assumes the lower position in relation to the axis $d$ of the cradle 3, where it will machine the other side of the teeth in the work 7.

Since the power cylinders 14 and 58 are operated by the same hydraulic system, the movable element 60 of the power cylinder 58 (FIG. 8) moves into the uppermost position simultaneously with the movement of the sleeve 12. The rack 59 associated with the element 60 moves therewith and thus turns the gear 61 and, consequently, the shaft 62 with the crank 57 until the projection 65 (FIG. 7) provided on the crank disk comes up against the stop 67. During the rotational movement of the crank disk 57 the connecting rod 54 imparts an axial motion to the worm 34 (FIG. 6), thereby rotating the cradle 3 about its axis $d$. This brings the grinding wheel 4 in position for machining the other side of the teeth in the work 7.

Then the machining cycle is repeated over again.

Thus, both sides of the gear teeth being ground are machined at one setting with a single abrasive wheel. In addition to a high rate of working, the machine ensures high accuracy of grinding straight bevel gears, in particular those with a module of 1.5 mm and below.

When grinding straight bevel gears with preliminarily cut tooth spaces, need arises for giving the grinding wheel 4 an additional angular movement in relation to the work 7.

In this case the machine operates substantially in the same way as described earlier.

In order to enter the grinding wheel 4 into the tooth space, the screw 73 (FIG. 6) is turned in the fixed nut 72 in the required direction, whereby the crank gear housing 64, which is held by the spring 74 against the screw 73, is imparted a pivotal movement. This causes the connecting rod 54 to move the worm 34 axially and thereby to turn the worm wheel 32 together with the cradle 3 and the grinding wheel 4 carried thereon.

By the angular movement of the cradle 3 and by feeding the workhead 5 with the workgear 7, the grinding wheel 4 is positioned in the tooth space so that during the machining process the wheel taper surfaces $b$ (between which is formed the peripheral cylindrical face $a$) will grind the pertinent side of the tooth.

Then the cycle of grinding one tooth side commences.

After the last tooth of the work 7 has been machined on one side, the cycle counter (not shown) initiates the action of the hydraulic system to set-over the machine for grinding the other side of the teeth.

Thus, the machine which constitutes the present invention can be advantageously used for grinding straight bevel gears, mainly with a small module (1.5 mm and less) both from solid blanks and from blanks with preliminarily cut tooth spaces.

We claim:

1. A straight bevel gear grinding machine for generating gear teeth by means of an abrasive disk tool, comprising; a main drive; a spindle arranged to mount an abrasive disk tool and receive a rotational motion from said main drive, said spindle and abrasive disk tool being adapted to revolve about their axis of rotation; a bed; a cradle mounted on said bed and adapted to impart a generating motion to said abrasive disk tool; a workhead spindle arranged to mount the work, said spindle being mounted on said bed and kinematically connected with said cradle; a carriage mounting said spindle with said abrasive disk tool, said carriage being arranged on said cradle so as to impart to said abrasive disk tool a reciprocating motion along the gear tooth being ground, said abrasive disk tool comprising substantially a grinding wheel with a cylindrical peripheral face formed between taper side surfaces and being adapted for set-over movement along its axis of rotation, said kinematic connection being provided to turn said cradle through an angle corresponding to and simultaneously with said axial set-over movement of the grinding wheel to complete thereby the set-over from grinding one side of bevel gear tooth to the other, whereby the single abrasive disk tool is enabled to grind both sides of the gear tooth at one setting of the work.

2. A straight bevel gear grinding machine as claimed in claim 1, wherein said spindle carrying said abrasive disk tool being mounted on the carriage by means of a sleeve, the spindle being positioned in said sleeve coaxially therewith and adapted to rotate in relation thereto, said sleeve being connected to the movable elements of power cylinders for the sleeve, together with the spindle and the abrasive disk tool mounted thereon, to perform said set-over movements along the axis of rotation of said abrasive tool.

3. A straight bevel gear grinding machine as claimed in claim 2, wherein adjusting the amount of set-over movements of said sleeve and spindle along the axis of rotation of the abrasive disk tool, said carriage has an adjustment mechanism comprising axial positive stops in the form of cams located in a slot formed in the exterior of said sleeve and fixed to the ends of pins rotatably mounted in said carriage, the other ends of said pins carrying graduated dials to indicate the amount of said set-over movements.

4. A straight bevel gear grinding machine as claimed in claim 1, wherein said cradle is driven by a worm and worm-wheel, and including an arrangement for imparting an axial movement to said worm by means of which the cradle performs said rotational set-over movement about its axis of rotation, said arrangement comprising individual drive mechanism and a crank gear having a connecting rod one end of which is connected with the cradle worm housing and the other end is connected to the crank pin of said crank gear.

5. A straight bevel gear grinding machine as claimed in claim 6, wherein said drive mechanism of the crank gear comprises a power cylinder, the drive being transmitted through the rack connected to a power cylinder movable element and constantly meshing with a spur gear fixedly mounted on a drawing shaft of said crank gear.

6. A straight bevel gear grinding machine as claimed in claim 5, wherein said crank gear is located in a housing accommodating bearings for the shaft which connects said crank with the gear of the drive mechanism, said housing being pivotally mounted on a stationary element of the machine so as to be positively pivoted in the plane of location of the worm and worm wheel for adjusting said worm axially.

7. A straight bevel gear grinding machine as claimed in claim 6, wherein the pivotal movement of said crank gear housing is effected by means of a screw pair comprising a nut and a screw, said nut being secured fixedly and said screw contacting said crank gear housing.

8. A straight bevel gear grinding machine as claimed in claim 4, wherein the crank disk of said crank gear has a radial projection which limits the angular movement of the crank by coming up against a fixedly secured stop, and including a slot diametrically disposed in said crank for accommodating said crank pin which is adpated to move in said slot for a preset amount which determines the amount of the cradle rotation during said set-over.

* * * * *